United States Patent [19]

Lincoln et al.

[11] Patent Number: 4,646,259

[45] Date of Patent: Feb. 24, 1987

[54] STRIP MAP MEMORY CONTROLLER

[75] Inventors: Andrew J. Lincoln, Concord; Robert Osborn, Arlington, both of Mass.; Geoffrey A. Dreher, Nashua, N.H.

[73] Assignee: Minolta Camera Kabushiki Kaisha, Osaka, Japan

[21] Appl. No.: 551,141

[22] Filed: Nov. 14, 1983

[51] Int. Cl.$^4$ .................. G06F 3/12; G06F 12/00; G06F 15/00

[52] U.S. Cl. .................. 364/900; 364/519; 340/799; 400/76

[58] Field of Search ... 364/200 MS File, 900 MS File, 364/518, 519, 521; 340/721, 734, 798, 799, 790; 400/63, 76; 358/280, 296

[56] References Cited

U.S. PATENT DOCUMENTS

| | | | |
|---|---|---|---|
| 4,251,871 | 2/1981 | Yu | 364/518 |
| 4,258,418 | 3/1981 | Heath | 364/200 |
| 4,300,206 | 11/1981 | Belleson et al. | 364/900 |
| 4,333,153 | 6/1982 | Mletzko et al. | 364/523 |
| 4,339,805 | 7/1982 | Iida | 364/900 |
| 4,370,730 | 1/1983 | Chadra | 364/900 |
| 4,371,948 | 2/1983 | Chadra | 364/900 |
| 4,371,950 | 2/1983 | Chadra | 364/900 |
| 4,375,079 | 2/1983 | Ricketts et al. | 364/518 |
| 4,381,553 | 4/1983 | Ferguson | 364/900 |
| 4,386,415 | 5/1983 | Chadra | 364/900 |
| 4,400,791 | 8/1983 | Kitado | 364/900 |
| 4,459,617 | 7/1984 | Ogawa et al. | 364/519 X |
| 4,470,129 | 9/1984 | Drisbrow et al. | 364/900 |
| 4,476,542 | 10/1984 | Crean et al. | 364/900 |

OTHER PUBLICATIONS

Yu, "Strip Buffer Overrun Control for Raster Page Output Operations", IBM Technical Disclosure Bulletin, vol. 23, No. 3, 8/1980.

Cavill et al, "Printer Data Processing/Word Processing Enchanced Controller System"; IBM Technical Disclosure Bulletin, vol. 24, No. 11B, 4/82.

Primary Examiner—James D. Thomas
Assistant Examiner—Thomas C. Lee
Attorney, Agent, or Firm—Price, Gess & Ubell

[57] ABSTRACT

A control apparatus for transferring characters from a font memory to a printer including a microprocessor which controls input and output of characters to and from a strip memory, tracks the status of input/output operations to insure overwriting of the memory does not occur, and supplies a minimal amount of control information to hardwired circuitry from which character building processes are autonomously controlled.

13 Claims, 13 Drawing Figures

STRIP MAP MEMORY CONTROLLER

BACKGROUND OF THE DISCLOSURE

The subject invention relates to character printing apparatus and particularly to apparatus for transferring character data between a data source such as a word processor font and a high speed printer such as a laser printer.

In conjunction with a scanning copier, the invention allows for receipt of graphical characters in any order, preserves the fixed scanned printing regimen during printing and eliminates the need to provide storage of a full graphical image of what will be printed. Instead, storage for only a small fraction of the complete image is required.

The invention may find use in devices in which an ordered raster scan image is to be created from an initially unordered set of graphical characters. Graphical characters are considered to be condensed representations of parts of a graphical image, which may describe ideographs, text, or other graphic objects, each with a specific or implied coordinate at which it will be placed in the final image. The preferred embodiment of the invention is in a copier which prints an image by scanning line by line, each line adjacent to the next, while receiving data from a host which produces characters in arbitrary textual order, such as a typical word processing system might send to a typewriter attached to it.

In such apparatus, it is desirable to transfer data from the font format to a random access storage facility where it can readily be extracted in real time in pixel format to accommodate the successive line scanning of the printer. Because of the speed of the printer, constraints are placed upon any device operating in real time. The complexity of the operations involved and the real time constraints present a challenge in designing an economical interface controller.

The controller must satisfy the major constraints that (1) the printer is supplied with print data at each request, (2) the building of characters keeps the limited controller memory supplied with data, (3) the building process is not permitted to overrun the controller memory area from which data is being extracted for printing, and (4) the processes all operate in real time.

It is therefore a major object of the invention to provide controller apparatus for a high speed printer which satisfies the foregoing constraints, while reducing hardware costs.

SUMMARY OF THE INVENTION

The foregoing and other objects brought out hereafter are achieved according to the invention by provision of apparatus including a strip map memory, hardware addressing circuitry for accessing the memory and a programmed processor controller (CPU). The strip map stores a selected number of lines to be printed, rather than an entire page. As lines are extracted to be printed, new lines are read in the strip map memory by cooperative action of the programmed processor controller and control logic associated with the hardware addressing circuitry.

The controller apparatus stores one character at a time (such as the letter "A") from the font memory into the strip map. In order to conserve memory and reduce execution time, the apparatus is designed such that the CPU need only specify to the control logic and addressing circuitry the minimum amount of information to build a character—namely where the character is to be built, i.e., stored in the strip map, what the character is, and where it may be found in the font memory. The control logic and addressing circuitry thereafter autonomously build the character into the strip map.

In the preferred embodiment, the character location and identity are specified by a number of bits in a character register and a register denoted the Font Etc. register. The build location in the strip map is specified by offset and high X bits and by X origin bits and Y origin bits. The control logic is constructed such that loading of the Font Etc. register by the processor causes a character building operation to commence and proceed to completion without further processor intervention. At completion of a character build, the processor is interrupted to determine what further operations should be commenced, such as another character build or an increment of the scan line address used to read character data out of the strip map to the printer.

In achievement of the above, the control apparatus allocates priority to a print operation over a build operation and maintains a window between the build and print lines, to eliminate the possibility of one process overrunning the other.

DETAILED DESCRIPTION OF THE PREFERRED EMBODIMENT

Figure 1:
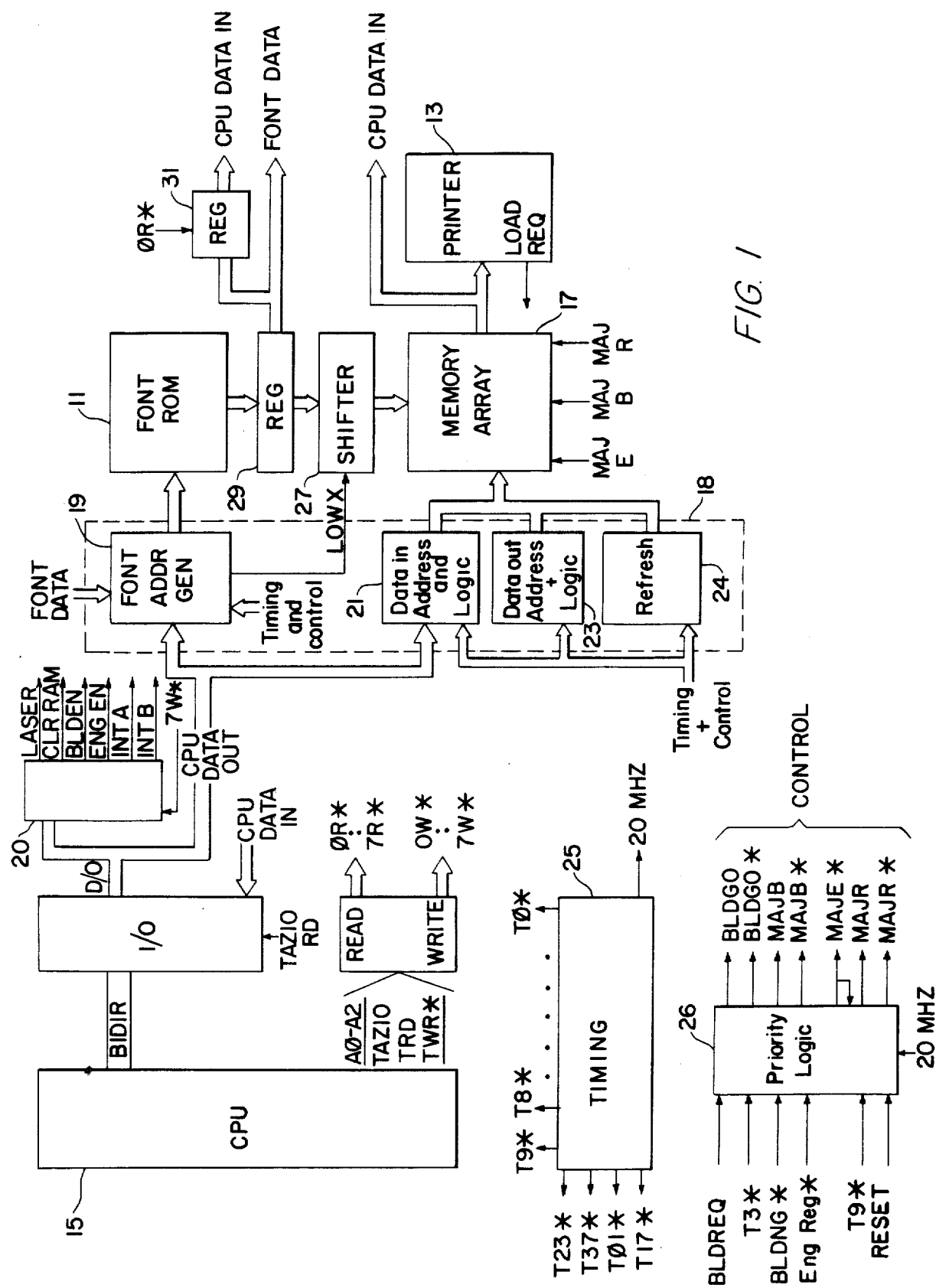
FIG. 1 illustrates a schematic block diagram of apparatus for implementing the preferred embodiment of the invention.

The preferred embodiment of the invention is illustrated in FIG. 1. The apparatus of FIG. 1 includes apparatus which interfaces between a Font ROM 11 and a printer 13. The Font ROM 11 may be such as used in a typical word processor, while the printer 13 may be, for example, a laser printer. In the preferred embodiment, the Font ROM 11 comprises a number of individually addressable ROM units. Character information from the Font ROM 11 is transferred to and stored in a memory array 17 for transfer to the printer 13.

The memory array 17 is organized as a "strip map." That is, the memory array 17 does not store the image of an entire document. Instead only enough image memory is available to create a "strip" of the document text. In the preferred embodiment, the maximum size of the strip is 256 scan lines—approximately one inch of text. Individual pixels on each scan line are either printed or not printed by the printer 13 to form character images such as alphanumeric characters.

Transfer of character data from the Font ROM 11 to the strip map memory array 17 and thence to the printer 13 is controlled by a central processing unit (CPU) 15 and strip map control circuitry 18.

The strip map control circuitry 18 includes font address generation and control circuitry 19, memory data-in address generating circuitry 21 and memory data-out address generating circuitry 23. The font address generation and control circuitry 19 generates addresses supplied to the Font ROM 11. These addresses cause data output from the Font ROM 11 through a register 29 and a shifter 27 to the memory array 17. The memory data-in address generating circuitry 21 provides addresses to the memory array 17 to indicate where pixel data supplied by the Font ROM 11 is to be stored in the memory array 17. The memory data out address generating circuitry 23 supplies addresses to the memory array 17 which cause data output to the printer 13.

Appropriate timing signals are applied to the apparatus thus far discussed by a timing generator 25. The timing generator 25 generates sequential timing signals T∅* through T9*. These signals are generated by driving a ten-bit shift register with a 20 MHz crystal oscillator. T0 through T9 constitute minor states in a major cycle of operation. Timing signals which are present for intervals are also produced such as T23*, T37*, T∅1* and T17*.

The CPU 15 used in the preferred embodiment is an Intel 8085. The CPU 15 communicates with the strip map control circuitry 18 through eight contiguous I/O port addresses. Each port can be a Read and/or Write port. Eight bidirectional data lines, three address lines, and five control lines provide the complete logical connection between the CPU and control circuitry 18.

The bidirectional data bus of the CPU 15 functions as an I/O port through a multiplexer—which provides eight data-out lines D0* to D07 and eight data-in lines DI∅ to DI7.

Figure 12:
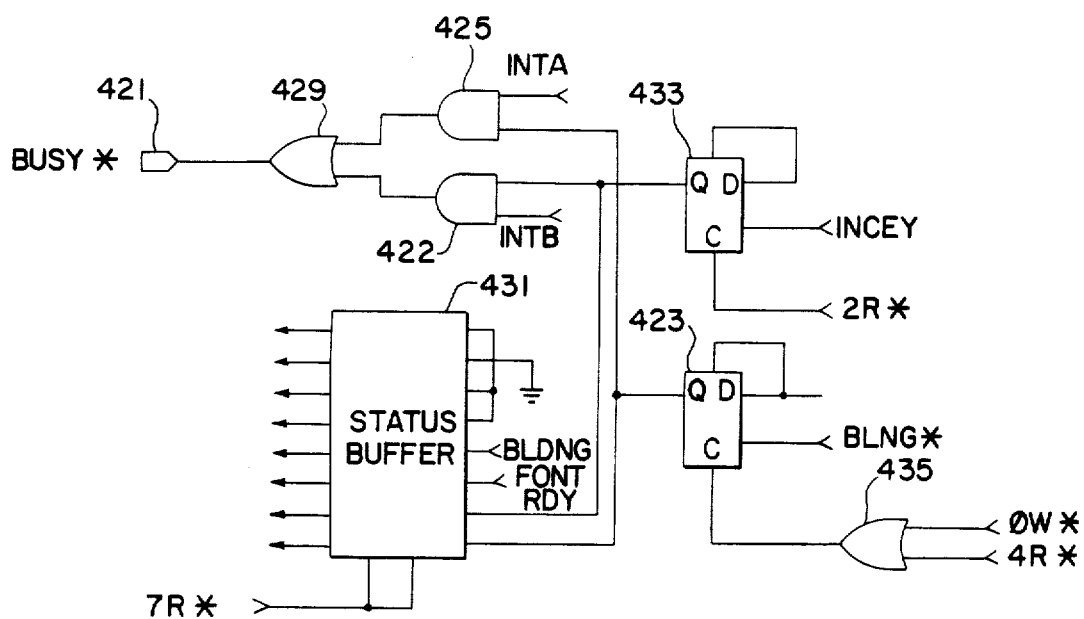
FIG. 12 is a logic diagram of circuitry related to generation of CPU interrupts.

The three least significant address lines of the CPU 15 are decoded to address one of eight I/O ports.
The five control lines are:
TAZIO*: A Decoded I/O request from the CPU 15
TRD*: CPU Read Signal
TWR*: CPU Write Signal
RST*: Master reset line to strip map control circuitry 18
BUSY: This signal (FIG. 12) is asserted high by the strip map control circuitry 18 to indicate that a Character Build is complete or that a new scan line is being read by the Engine. The CPU then examines the SMC status bits to determine the interrupt type.

The CPU 15 also provides output control signals A∅ to A2, which, with TAZIO, TRD and TWR*, enable read control signals ∅R* to 7R* and write control signals ∅W* to 7W*.

Figure 2:
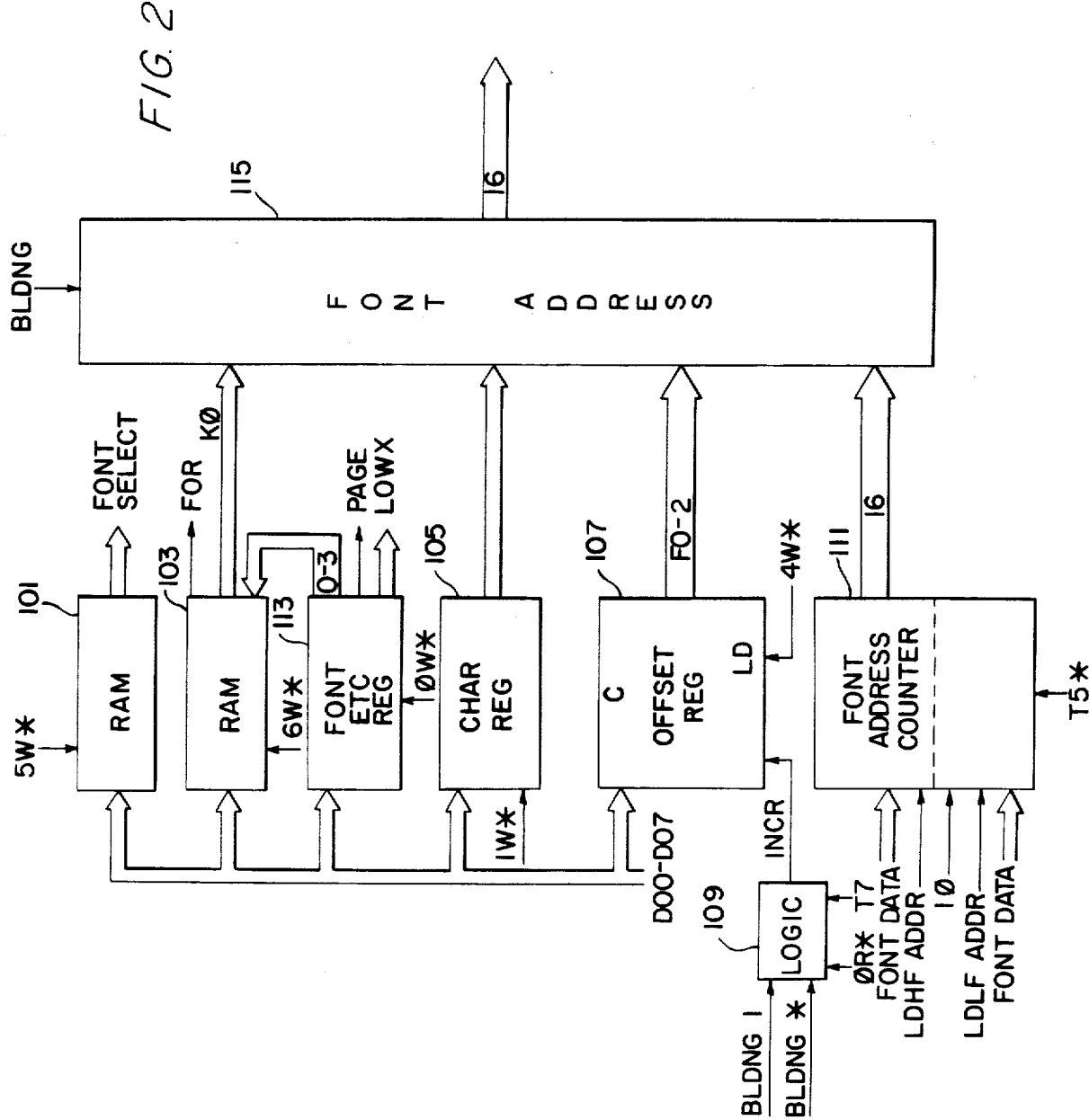
FIG. 2 illustrates circuitry for addressing the font in the preferred embodiment.

The I/O Read ports and their significance are:

| Relative I/O Addr | Action |
|---|---|
| 0 | Read Font Data. A data path is provided to allow the CPU 15 to read data from the Font ROM 11. |
| 1 | Engine Data. Reading this port will provide the same data and initiate the same functions that occur when a byte of data is read out to the printer 13. This port is used for diagnostic purposes. |
| 2 | Engine Low Y Address. Provides the low 8 bits of the present scan line which is presently being read out to the printer 13. |
| 3 | Engine High Y Address. Provides the high 8 bits of the present scan line which is presently being read out to the printer 13. |
| 4 | No meaningful data is provided. The "Build Done" Flag is cleared. The only other way to clear this flag is by writing to the Font Etc. Register (FIG. 2). Unfortunately, this may also initiate another build cycle. Reading this port provides a means of clearing this flag without starting another build cycle. |
| 7 | SMC Status. The four least significant bits are meaningful: <br> Bit 0  Build cycle is done <br> Bit 1  Engine Scan line increment <br> Bit 2  Font Ready <br> Bit 3  Building a character into the strip map 17 <br> The remaining bits are always 0 |

The I/O Write ports and their significance are:

| Relative I/O Addr | Action |
|---|---|
| 0 | Font Etc. Register. This register contains three items. Bits 0–3 are the Font Select. Bits 4–7 are the Low X Offset for specifying the bit position of a character to be built. Bit 7 is the "Page" specifying which memory page the character will be built in. |
| 1 | Character Register. Determines what character will be built. This data is used to create an address to the Font ROM. |
| 2 | X Scan Origin. The X address at which the character will be built. |
| 3 | Y Scan Origin. The scan line in the strip map 17 where the character will be built. |
| 4 | Font Offset. The lower 3 bits F0 to F2 are used in forming an address to the Font ROM 11. |
| 5 | Font Select. Data to the "Font Select" RAM 101. This 16×8 RAM allows the software to initially specify up to 16 fonts and indicate how these fonts are accessed. Afterwards, when addressing is under control of the logic of FIG. 2, the low 4 bits of the Font Etc. register 113 will set up the proper addressing. (These 4 bits are the address lines to the 16×8 Font Select RAM.) |
| 6 | Data to a 16×8 RAM 103 which operates similarly to the Font Select RAM 101. Five of the 8 bits are used. The lower 4 bits provide the most significant address lines for font addressing. The MS Bit indicates Portrait or Landscape mode. |
| 7 | Control Port 20 <br> Bit 0  Interrupt on Build Done <br> Bit 1  Interrupt on Scan Line Increment <br> Bit 2  Allow the engine printer to read strip map memory <br> Bit 3  Build Enable. This must be set in order for a write to Font Etc. to initiate a build sequence. <br> Bit 4  Engine Enable. This starts the engine |

-continued

| Relative I/O Addr | Action | |
|---|---|---|
| | | read process by reading the first byte of strap map memory. |
| | Bit 5 | Read Strip Map memory |
| | Bit 6 | Clear Strip Map Memory |
| | Bit 7 | Laser/Stylus* |

Priority logic 26 provides control signals to memory array 17 and other elements denoted MAJB (build), MAJE (engine) and MAJR (refresh). These signals are associated respectively with character building in the memory array 17, character printing (engine cycle) from the array 17, and refresh of the memory array 17. A build operation has lowest priority, and hence MajB is inhibited if an engine request or refresh operation is pending.

The priority logic 26 receives a number of input signals which enable it to allocate priority to these operations. These input signals will be discussed in more detail hereafter.

The presence of a major E signal will cause production of additional engine cycle control signals E∅1*, EL3*, E4* and E8*, while presence of MAJB produces control signals B∅1*, B23*, B5* and B8*. The function and sequencing of these signals will become apparent in the following discussion.

According to the preferred embodiment, initially, the CPU 15 reads data from the Font ROM 11 which defines certain character parameters. The CPU 15 stores this information in its own system memory and uses it to determine where to locate characters in the memory array 17. The CPU 15 then causes the memory array 17 to be loaded with font data. In this operation, the CPU provides the strip map control circuitry with initial addressing information. The controller circuitry 18 then autonomously handles transfer of the character from the Font ROM 11 into the strip map memory 17. The CPU is interrupted at completion of this character build.

After the memory array 17 has been fully loaded at start-up, the printer 13 requests data from the memory array 17, a byte at a time. In response, the CPU 15 and timing generating circuitry 25 control the memory data-out addressing circuitry 23 to withdraw data from the memory array 17 and supply it to the printer 13. At the same time, the CPU 15 monitors the scan line number currently being read out to the printer 13. When enough memory is available for additional characters, the font address generating circuitry 19, the data-in addressing circuitry 21 and the CPU 15 cooperate to load new scan lines into the memory array 17 to replace those which have been removed and transmitted to the printer 13 for printing.

CHARACTER BUILDING CIRCUITRY AND OPERATION

Figure 3:
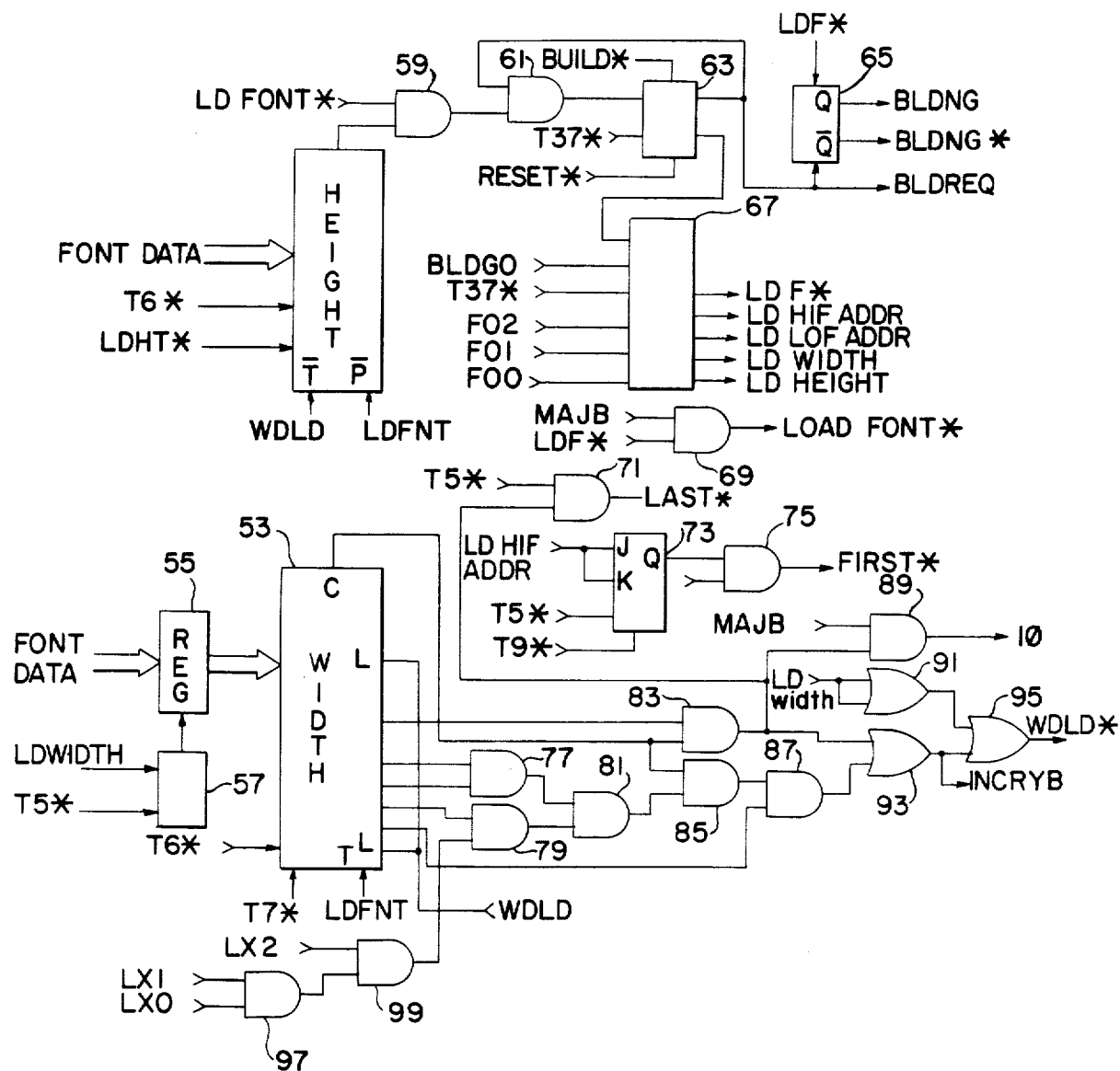
FIG. 3 is a logic diagram of font address control circuitry according to the preferred embodiment.

FIGS. 2 and 3 illustrate an embodiment of the font address generating circuitry 19. FIG. 2 in general shows addressing registers, while FIG. 3 illustrates control logic used in the addressing process.

In FIG. 2, a font address register 115 provides 16 bits of addressing to the Font ROM 11. Arrayed adjacent the font address register 115 are RAM storage units 101, 103, a character register 105, an offset register 107, a font address counter 111 and a Font Etc. register 113. The font select RAM 101 receives font select input signals from the data bus of the CPU 15 and a write control signal 5W*. It outputs a font select signal, which selects a particular ROM unit of Font ROM 11. The second font select RAM 103 also receives an input from the data bus of the CPU 15 and a write control signal 6W* and supplies output signals K∅ to the font address register 115, and a control signal FOR. The character register 105 receives eight character bits from the CPU data bus and provides eight input bits to the font address register 115. The character register 105 also receives a CPU write control signal 1W*.

The offset register 107 receives input from the CPU data bus and provides offset bits F0 to F2 to the ROM address register 115 and to the control logic 65 of FIG. 3. The offset register 107 receives an increment control signal INCR from logic 109 and a write control signal from the CPU designated 4W*. This register 107 is used to allow reading Font ROM data by the CPU 15 and to supply the low 3 bits of Font ROM address during parameter extraction.

The font address counter 111 provides 16 address bits to the font address register 115. This address counter 111 consists of a high font address counter (high 8 bits) and a low font address counter (low 8 bits). These respective counters receive inputs of font data, as well as the control signals LDLFADDR, LDHFADDR and 1∅ from the logic of FIG. 3.

The Font Etc. register 113 receives an 8-bit input from the CPU data bus and provides four font address bits FNT0 to FNT3 to the RAM 103, a page bit, and three bits indicating low X offset. The Font Etc. register also receives a write control signal ∅W* from the CPU 15.

The control logic of FIG. 3 includes a height counter 51 and a width counter 53, which may be loaded with respective character height and character width indications from the font data output on lines FD7 to FD∅. The height counter 51 is caused to be loaded by a control signal LD HEIGHT* and receives a further T6* timing control signal on pin 2, a WDLD* control signal to the T̄ pin and the control signal LDFONT* to the P̄ input. The width counter 53 is caused to be loaded by the T7* timing signal and has its T̄ input connected to the LDFNT control signal and pin 2 to the T6* timing signal.

The width counter 53 counts down to "1" and the logic on its output includes a "1" detector. Logic connected to the carry output of the height counter includes gates 59, 61; flip-flops 63, 65 and an LS138 device 67. The LS138 device receives input signals BLDGO from the priority resolution logic 26, timing signal T37* and the three output bits F0 to F3 of the font offset register 107. The LS138 device generates control signals designated LDF*, LD HIF ADDR*, LD LOF ADDR*, LD WIDTH*, LD HEIGHT*.

Other major control signals are supplied as follows. The flip-flop 63 generates a build request signal BLDREQ, and flip-flop 65 provides control signals BLDNG and BLDNG*. The load font control signal LDFONT* which is supplied to the height and width counters 51, 53 is generated by a gate 69 which receives inputs of the MAJB* and the LDF* control signals.

The logic connected to the width counter 53 includes gates 77, 79, 81, 83, 85, 87, 89, 91, 93, 95. Logic gate 79 receives an input from two gates 97, 99, which in turn receive the low X input bits from the Font Etc. register 113. The output of gate 83 is further supplied to logic including gates 71, 75 and a flip-flop 73.

The foregoing logic provides several control signals. Gate 71 provides the LAST* control signal, gate 75 provides the FIRST* control signal, gate 89 provides the 1∅ control signal supplied to the font address counter 111, gate 95 provides the WDLD* control signal, and gate 93 provides the control signal INC RYB.

At the same time as font data is being addressed and read out of the Font ROM 11 in response to addresses supplied by the circuitry shown in FIG. 2 and FIG. 3, addresses must also be generated to place that data correctly into the memory array 17. Generation of these addresses and transfer of them to the memory 17 is accomplished by the address-in generating circuitry shown in FIG. 4.

Figure 4:
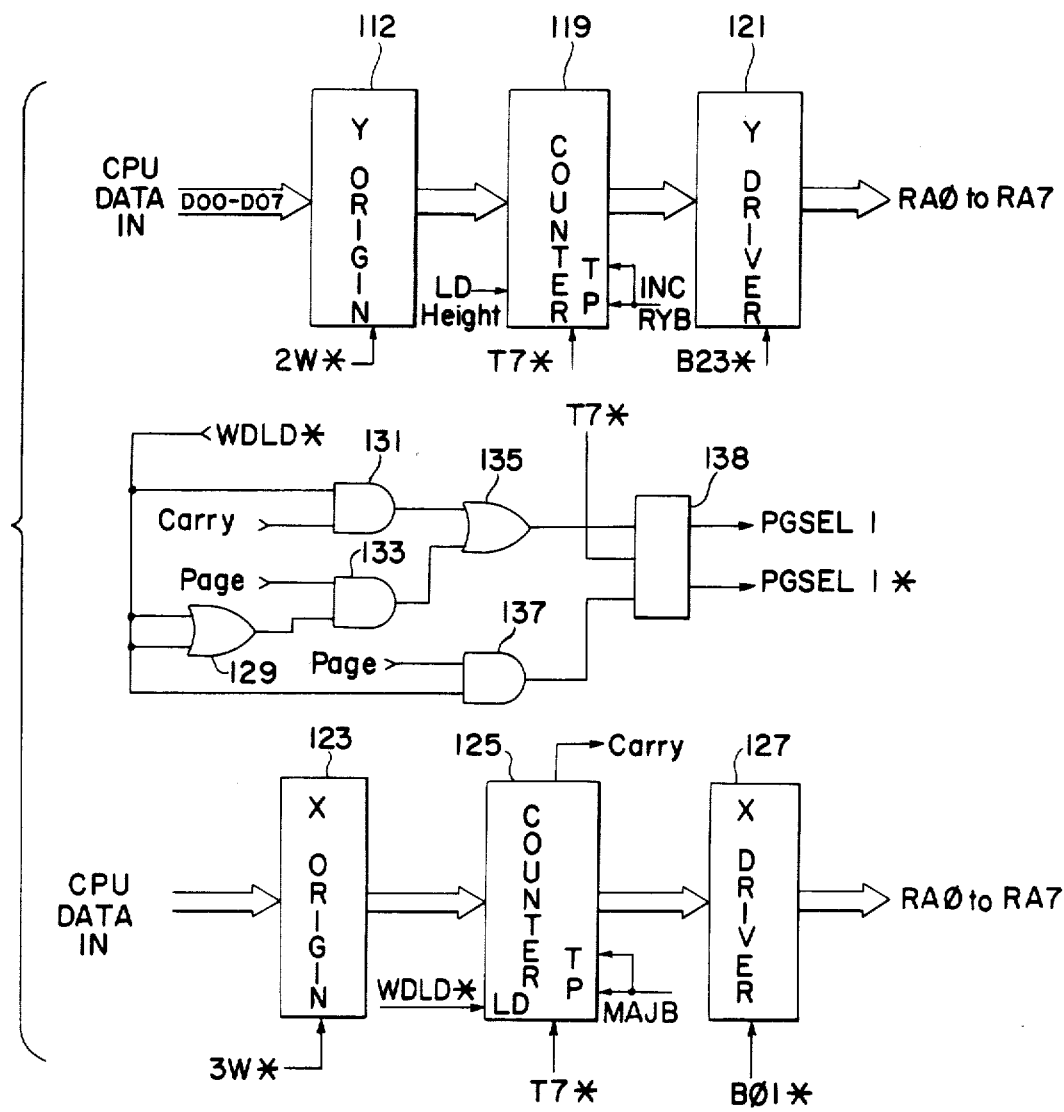
FIG. 4 is a schematic circuit diagram of circuitry for providing data-out (write) addresses to the memory array of the preferred embodiment.

The circuitry of FIG. 4 supplies X and Y addresses to the memory array 17. The Y address is stored by the CPU into the Y origin register 112. It is then supplied to a counter 119 which outputs to a driver 121 supplying the memory address circuitry of the memory array 17. Similarly, an X origin register 123 is provided for receiving an X address from the CPU data bus, supplying the X address to a counter 125 and thence to a driver 127 for supply to the memory array 17.

The address-in generating circuitry of FIG. 4 also includes control logic for generating control signals PGSEL1 and PGSEL1* for supply to the memory array 17. The PGSEL signals are page select control signals which select a particular half of the memory array 17. These signals are supplied by a flip-flop 138, which receives inputs from a gate 137 and a gate 135. The gate 135 receives inputs from gates 131 and 133. Gate 133 receives an input from gate 129. The WDLD* control signal forms inputs to gates 131, 129 and 137.

The operation of the circuitry of FIGS. 2, 3 and 4 in building a character into the memory array 17 will now be discussed. When a character is to be built, information regarding the character's parameters must be provided to the circuitry of FIGS. 2 through 4 by both the CPU 15 and the Font ROM 11. The beginning of each font in the Font ROM 11 contains a table which provides parameters concerning the characters in the ROM. Each entry in the table is made up of 8 bytes. The ordering of these 8-byte entries in the table corresponds to the character number. The character number is equivalent to the ASCII value for the particular character (e.g., character No. 41 hex refers to the character "A"). The 8 bytes in each table entry for each character are:

0: character height
1: character width
2: character data address, low byte
3: character data address, high byte
4-7: additional placement information used by the CPU 15 to determine the exact placement of a character on the document.

Whenever the system is started up, the CPU 15 configures the font select RAMs 101, 103 and reads out the eight parameters for all characters in the Font ROM 11, storing them in its own memory. These parameters are used by the CPU 15 to properly position characters on the page, i.e., properly calculate the X and Y origin addresses.

To perform this initial start-up function, the font offset register 109 is set to zero if it is not already at this value. The 8 parameter bytes are then made available to the CPU 15 by repetitively reading the font data register 31. The CPU 15 reads the register 31 by supplying it with the ∅R* control signal. This signal ∅R* is also connected to logic 109 and increments the offset register 107.

After reading in the 8 parameter bytes for each character, the CPU 15 has the information necessary to place characters. Note at this point that none of the character parameter bytes have been written into the registers of FIGS. 2, 3 or 4. They have merely been taken in by the CPU 15 for purposes of computing X and Y locations in the memory array 17. The X location in the memory array 17 is a 12-bit value which describes the bit number on the scan line. The Y value is an 8-bit value which is the scan line number (modulo 256). After start-up, when character building into the strip map 17 begins, the Y value is written to the Y origin register 112 of the address-in generating circuitry 21 (FIG. 4). Parts of the X value are written by the CPU 15 to three places. The low 3 bits determine the bit offset and constitute the low X offset. These are written to bits 4, 5 and 6 of the Font Etc. register 113. The next 8 bits are the byte value on the scan line and are written to the X origin register 123 (FIG. 4). The most significant bit is the page bit, which selects the particular memory bank (one of two) and is written to bit 7 of the Font Etc. register 113.

In practice the Font Etc. register 113 is the last register to be written by the CPU 15 during a typical character build. If the build enable control bit BLDEN has previously been set at port 20 by the CPU 15, writing to the Font Etc. register 113 by generation of the ∅W* signal will automatically initiate a character build sequence, i.e., transfer of a character into the memory array 17 (build=BLDEN AND ∅W*).

The steps in the typical build sequence are as follows. The build signal to flip-flop 63 sets the BLDREQ line and clears the font offset register 107. On the next T3, a request for control signal BLDGO will be generated to logic 26. On the next T9, the BLDGO signal will be asserted by the priority logic 26. Thus, a two stage delay is provided prior to assertion of BLDGO by logic 26 in order to accommodate combinatorial delays through the font select RAMs 101, 103; the address decoders on the Font ROM board; and the access time of the Font ROMs 11.

The assertion of BLDGO by logic 26 enables the LS138 device 67. This enablement permits other enabling signals to generate outputs from the LS138 in order to read the first four character parameters out of the Font ROM 11 to the memory control circuitry 18. The first parameter readout is the character height, which is loaded into the height counter 51 at T6. On the immediately succeeding T7, the font offset register 107 is incremented via logic 109. This incrementation causes the font offset input bits to the LS138 to change, causing the LDWIDTH* control line to be asserted. After this assertion, on the next T5, the width register 55 is loaded. The width counter 53 is also loaded with the same data on T7 of this cycle. In this operation, logic gate 91 receives the LDWIDTH* input and causes logic gate 95 to output control signal WDLD*. WDLD* is the load enable for the width counter 53, and together with timing signal T7* causes loading of that counter on T7.

In each of the next two cycles the offset register outputs F0 to F02 experience an increment, thereby causing the LS138 to output the load high F and load low F address signals which respectively load the low font address and high font address into the address counter 111.

On the next succeeding cycle, the control signal LDF* is asserted by the LS138 device. This assertion is again a result of incrementing the offset register 107. LDF* continues to be asserted during T3 to T7 of every cycle thereafter because (1) the assertion of the control signal BLDNG by flip-flop 65 in response to LDF* locks out the increment clock to the font offset register 107 via the logic 109, and (2) the enable signal T37* is supplied to the LS138 device 67.

The control signals LDF* and MAJB* also generate the control signal LD FONT* via AND gate 69. This signal controls various counting and timing functions during the build process as illustrated.

The beginning of a MAJB cycle initiates a read of data into the memory array 17. Row and column addresses for array 17 are supplied by the X and Y address counters 119, 125 (FIG. 4). As shown, the drivers 121, 127 supplying the addresses to array 17 are enabled by control signals B23* and BØ1* which are produced by the CPU 15 if, and only if the MAJB signal is present.

Simultaneously with the generation of the row and column addresses for the array 17, the Font ROM data addressed via address counter 111 is moving through the shifter 27 (unchanged because low X=0). The present contents of the memory array 17 and the font data read from font memory 11 are ORed together to form the new contents of the memory location addressed in array 11. The result of the OR operation is written to the memory in memory array 17 addressed by the X and Y addresses on T7 of the memory read cycle.

If the character width counter 53 contains a count greater than 1, it is decremented on T7 of the same cycle as that in which data is written to the memory array 17. The row address counter 125 is incremented at the same time to set up the row address for addressing the memory array 17 on the next cycle. If on this next cycle, the width counter 53 contains a value of 1, then the build process for this scan line has been completed and the next scan line must start.

To implement the foregoing operation, "one detector" circuitry is placed on the output of the width counter 53. The output of gate 87 constitutes the "one detect" signal. This signal generates a control signal INC RYB, as well as the control signal WDLD*. The INC RYB control signal increments the Y scan address via an input to the scan line counter 119. The INC RYB signal thus increments the Y scan address to move to the next scan line. The WDLD* signal will reload the X address counter 125 (row address counter), as well as the width counter 53.

The WDLD* signal also decrements the height counter 51. If the height counter 51 decrements to 0, a carry signal supplied to gate 59 will be generated. This signal will cause the control signal BLDREQ outputted by flip-flop 63 to be deasserted at the end of the cycle under process. Deassertion of the BLDREQ signal terminates the building process by clearing the BLDNG flip-flop 65.

The deassertion of BLDNG generates an interrupt to the CPU 15 so that another build cycle can be initiated. This interrupt is generated by the busy line 421 (FIG. 12) via application of the signal BLDNG* to a flip-flop 423 whose output is supplied to a gate 425 enabled by the INTA signal output by device 20 of FIG. 1.

The foregoing discussion assumes that the character being read from the Font ROM 11 to the memory array 17 is on a byte boundary; i.e., the low X value is 0. The build process varies slightly if the character is not on a byte boundary. The differences involve the shifting of the font data by the shifter 27. This entails an extra build cycle for each scan line, as will now be discussed.

The shifter 27 and its associated circuitry allow a character to be placed at any bit location in the memory array 17. When the Low X count is nonzero (1-7), a shift is required. This is complicated by the fact that more than a single byte of data must be shifted to move a character to a specified bit location. The entire character width must be shifted. As an example, consider a string of bytes in the Font ROM 11 which describes a single scan line of a character. This string which is, say, four bytes long, appears in the Font ROM 11 as:

| B7   B0 Byte 0 | Byte 1 | Byte 2 | Byte 3 |
|---|---|---|---|
| 11100110 | 00111111 | 10000011 | 11001110 |

If this byte string is shifted by three bits, it must appear in the Strip Map Memory as:

| Byte 0 | Byte 1 | Byte 2 | Byte 3 | Last |
|---|---|---|---|---|
| 00011100 | 11000111 | 11110000 | 01111001 | 1100000 |

Two constraints apply here. First, the bits are shifted with zeroes placed in the leading bits and they must cross byte boundaries. Second, an additional Memory/Write cycle must be performed to accommodate the remaining bits from Byte 3. The lower five bits in the "Last" byte, in this case, must be unchanged. It should be noted that all build memory cycles are read-modify-write and the new font data is ORed into the present memory contents.

The shifter is made up of eight LS151 8 to 1 selectors. One device services a single data bit. The source data for these selectors is SB0-SB15. SB0-SB7 is the present font data. SB8-SB15 is the Font Data from the previous build cycle. Maintaining the previous font data provides a means of moving bits over byte boundaries. Setting the appropriate bits to zero on the first and last bytes is accomplished by clearing the previous bits (SB8-SB15) on the first Strip Map write of a scan line, and clearing the present font data (SB0-SB7) on the last memory write of a scan line. The signals providing these clear functions are the FIRST* and LAST* signals, respectively.

Referring back to the Character Width counter 53, if the Low X count is nonzero, the output of gate 99 will be "high." The "Ones" detector is disabled, and a zero count is sensed by gate 83. When a zero count is sensed from the width counter 53, the last byte of the scan line for the character is being written. During this cycle, LAST* is generated at T5 before the actual write to the memory 17 at T7. After this write occurs, FIRST* is generated at T8. This is done because the next Build cycle will be writing the first byte of the next scan line. Note, also, that the Font Address counters 111 are not allowed to increment during this cycle. The Font Address is actually pointing to the first byte of the next scan line during this cycle, and must maintain this value until the build for the next line begins.

ENGINE CIRCUITRY AND OPERATION

An engine cycle, i.e., a read from memory array 17 to the printer 17, is accomplished by means of an X engine address counter 501 and a Y engine address counter 503. The X engine address counter 501 provides a byte (character) address. The Y engine address counter 503 provides the address of the particular scan line being addressed. The X engine address counter 501 is successively incremented to address successive pixels in a row (scan line). When an entire row has been addressed, the Y address is incremented to locate the next row, and the X engine address counter 501 is reset.

The printer 13 asserts a load request LDREQ, and the CPU 15 asserts ENG EN from the control status register port 20. The CPU 15 clears the X and Y engine address counters by providing appropriately timed control signals to generate ENGSTRT* and ENGST. The CPU 15 also asserts 1R* which causes ENG REQ to be raised. Raising ENG REQ then permits assertion of the MAJ E control signal, giving priority to the engine request.

The assertion of ENG STRT has also caused generation of a page select signal PGSELØ*. At the appropriate time EØ1*, the X address of the first byte (address zero) is provided to the addressing circuitry of memory 17. Thereafter, at E23*, the Y address of the first scan line is provided to the addressing circuitry of memory 17, thereby providing the multiplexed address to the particular dynamic rams utilized in this embodiment.

When an entire scan line has been written, a flip-flop 517 produces the signal INC EY to increment the Y address. This signal also activates the busy line 421 (interrupt) to the CPU 15 via the circuitry of FIG. 12.

SYSTEM SOFTWARE

As indicated by the above description, the system software controls the character build hardware and the engine (print) hardware. Several major constraints direct the software design. These are (1) the printer must be supplied with print data at each request, (2) the building process must keep the memory supplied with data, (3) the building process cannot be allowed to overrun the memory area from which data is being read out, and (4) the processes must all operate in real time.

An interrupt routine for servicing the strip map will now be illustrated with respect to FIGS. 6-11 to illustrate the system software design in more detail. This interrupt routine is designed with respect to the preferred 8085 processor. However, the design considerations brought out by this discussion will be applicable to various adaptations.

The strip map interrupt routine performs all direct character building interface functions between the data structures representing the characters and the hardware of FIGS. 2, 3, 4 and 5. It must keep track of a number of possible events and must run in "real time" since the building of every character requires an action by the interrupt routine. Functionally, the interrupt routine must insure that each character is built in the correct place at the correct time and signal when it is not possible to build the character in time. The routine is written so that, if a character needs to be built, the hardware is started as quickly as possible and any remaining "housekeeping" work is done while the hardware is building the character. The hardware is designed to require only the minimum amount of information to build a character, i.e., the pixel location at which to start building and the complete character identification (character number and font).

Figure 5A:
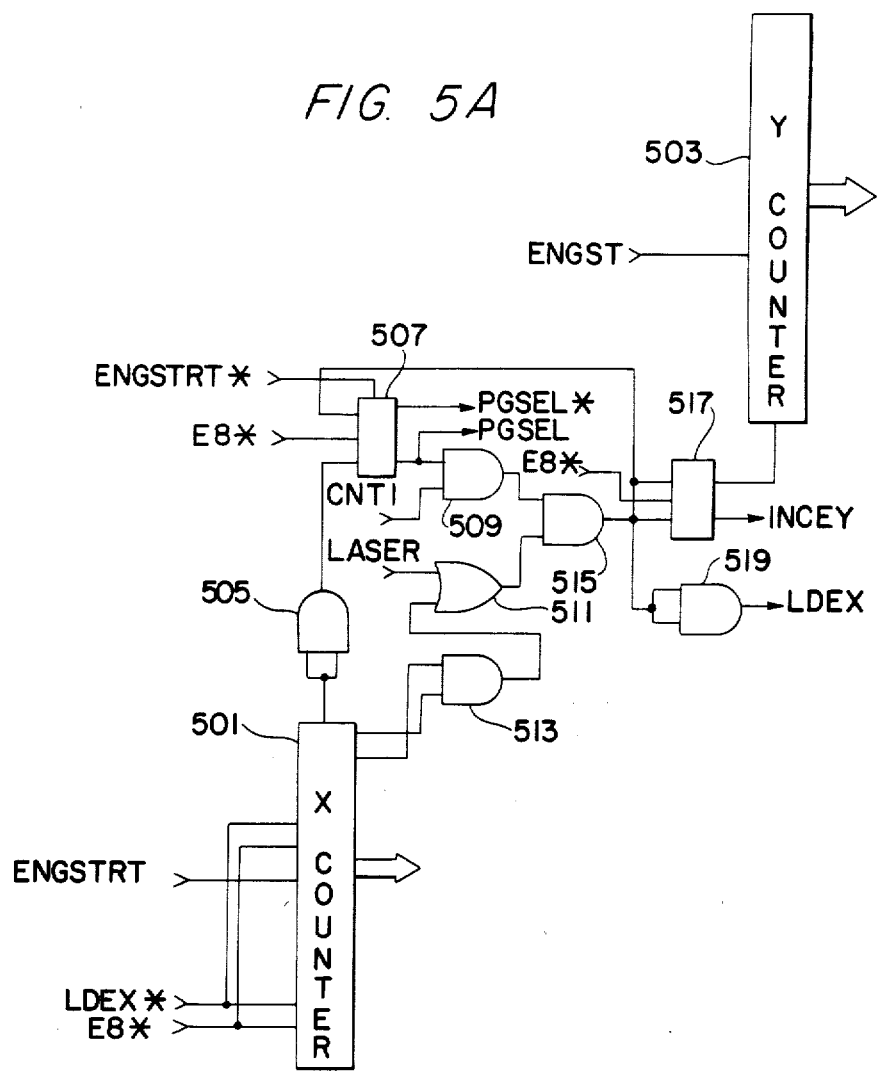
FIGS. 5A and 5B are schematic circuit diagrams of circuitry for generating data-out (read) addresses to the memory array of the preferred embodiment.
Figure 5B:
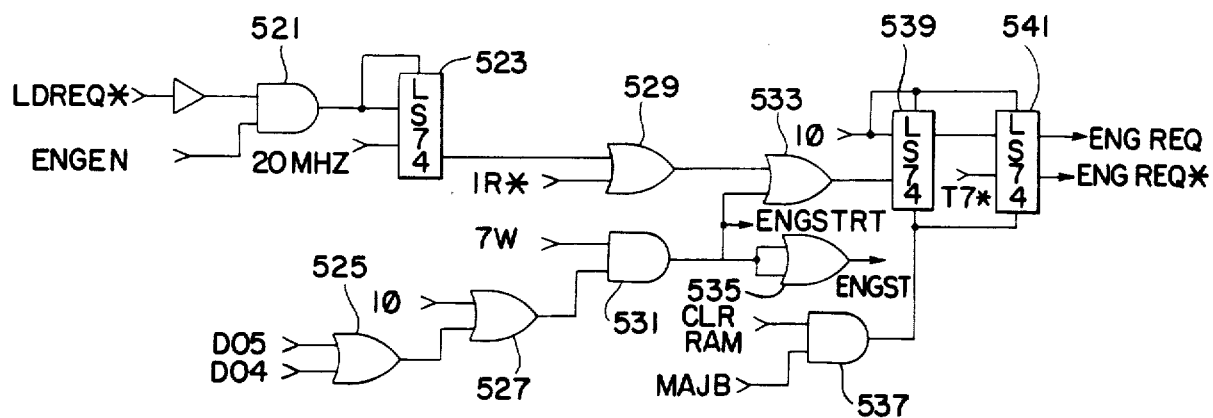

Since the printing of the strip proceeds in scanning order of the engine addressing circuitry of FIG. 5, and since the building of characters must always precede their printing, the CPU 15 at start-up initially sorts all incoming characters by their starting scan line number. A "bin" sort is preferred. In this particular case, the bin sort means that there is an array of pointers, with each entry representing a scan line. The pointers point to a linked list of all characters that start on that scan line. The index into the array 17 specifies the scan line number. At start-up, as each character is received from the font 11 by the CPU 15, and its print position is determined, it is sorted by finding the scan line number of its starting scan line (the earliest scan line with a pixel on it) and linking the character into the appropriate place in the line index array. When all characters for a page have been received by CPU 15, a special pointer value (FFOO) is placed into the pointer array on the line after the last line used. Thus, all scan line pointers either have an NILL (0) value, meaning that there are no characters that start on this scan line, the value OFFOOH indicating that this scan line is the end of the page, or a pointer to a linked list of characters that start on that scan line.

During execution, the interrupt routine keeps track of which scan line of characters it is trying to build with a variable denoted BLINE. It also keeps track of the scan line number (modulo the size of the strip) in a variable called YORG. YORG is the value that actually is placed in the hardware Y origin register 112 to determine the place in the memory array 17 that the line will be built.

Each character that starts on a scan line is linked to all others that start on that scan line. The character cells in the memory of CPU 15 contain only the minimum amount of information required to uniquely specify that character and to point to the next character. This information is packed in a form that is directly loadable into the hardware registers at execution time.

Each character cell in the CPU memory contains:

1. Character code to be loaded into the hardware character register 105. This code specifies which character is to be built.

2. The byte location along the scan line at which to start building the character, which is loaded into the X origin register 123.

3. The font, low 3 bits of the place along the scan line, and the highest bit of the place along the scan line, which is loaded into the Font Etc. register 113. Loading this register also has the side effect of causing the character to actually be built, as noted above.

4. A 2-byte pointer to the next character to be built on this line. If this pointer is 0 then there are no more characters to build on this line.

Note that the scan line number need not be kept in the character cell since it is implicit in the fact that the character cell is linked into a linked list of character cells, the head of which is pointed to by the entry in the line index array.

During execution, the interrupt routine keeps track of the character that is to be built next with the pointer PNXT. This pointer is always maintained to point to the NEXT character cell to be built. This allows the interrupt routine to always start the building process prior to doing any housekeeping, e.g., finding the next character to build, thereby overlapping CPU housekeeping with character building.

The interrupt routine can be considered to be in several major "states" of execution, even though it is not strictly constructed as a state machine. To understand these states, it is necessary to understand the basic nature of the strip map process. Remembering that a character cannot be built if there is a chance that it will write over the line that the engine is currently reading, it can be understood that sometimes, even though there is a character ready to build, its building will have to be delayed until the engine has emptied enough scan lines so that the character can be built without overwrite. While the interrupt routine is waiting for the engine to empty sufficient scan lines, the interrupt routine is said to be in the "out-of-window" state. When the interrupt routine is able to build characters without danger of overwriting the current engine scan line, it is said to be "in-window." These two states comprise the primary states of the interrupt routine.

Figure 6:
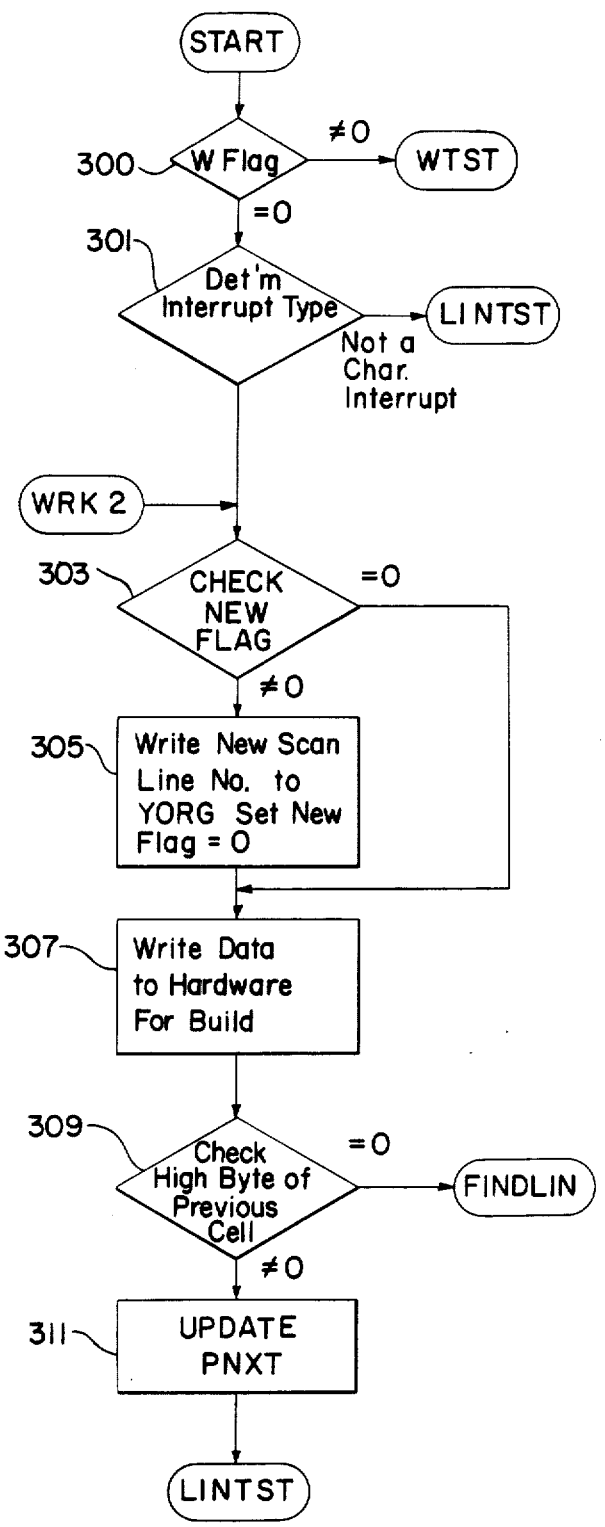
FIG. 6 is a flow chart useful in illustrating the operation of the central processing unit (CPU) of the preferred embodiment.

Referring to FIG. 6, the first thing that the interrupt routine checks when it starts execution in response to an interrupt is whether it is in-window. A byte denoted WFLAG keeps track of this condition. If WFLAG is zero (test 300, FIG. 6), then the interrupt routine is in-window.

If the interrupt routine is in-window, then it can start the hardware building the next character, but only if the previous character has been completed. Note that interrupts can be due to either the engine scan line number being incremented or due to completion of a character build, or both.

The interrupt routine therefore next checks to see if the previous character build has completed (test 301). If it has not yet completed, then it branches to a section of code LINTST (FIG. 9) that handles the engine scan line interrupts. If it has completed, then the interrupt routine knows it can start building another character. Before it can write out the contents of the character cell in the CPU memory, however, it must check to see if it must send out a new scan line number. It does so by checking a value denoted NEWFLAG (test 303). If NEWFLAG is not zero, then a new scan line number is written to the Y origin register 112 in the hardware, and NEWFLAG is zeroed.

Next, as indicated at block 305, the contents of the character cell pointed to by PNXT is written to the appropriate registers 105, 123, 113 to start the character building process.

Now, while the previous character is being built, the interrupt routine must find the next character to build and set up the appropriate pointer in PNXT. To do so, it checks to see if the high order byte of the pointer to the next character in the present character cell is zero (test 309). If it is not zero, then it merely places the entire 2-byte pointer value in PNXT (block 311), since there are still more characters to build on this line.

If this character was the last on the scan line determined by BLINE, then the routine must find the next line with characters on it. To do so, it must search through the line index array for an entry that is not zero. A nonzero value could mean either a scan line with characters on it or the end of a page (if the line index array entry is OFFOOH). This search is performed by a code segment denoted FINDLIN shown in FIG. 7. Before FINDLIN starts its search procedure, however, it calls a subroutine denoted INWIND to determine if the engine has overtaken the building process (block 321 of FIG. 7).

Figure 8:
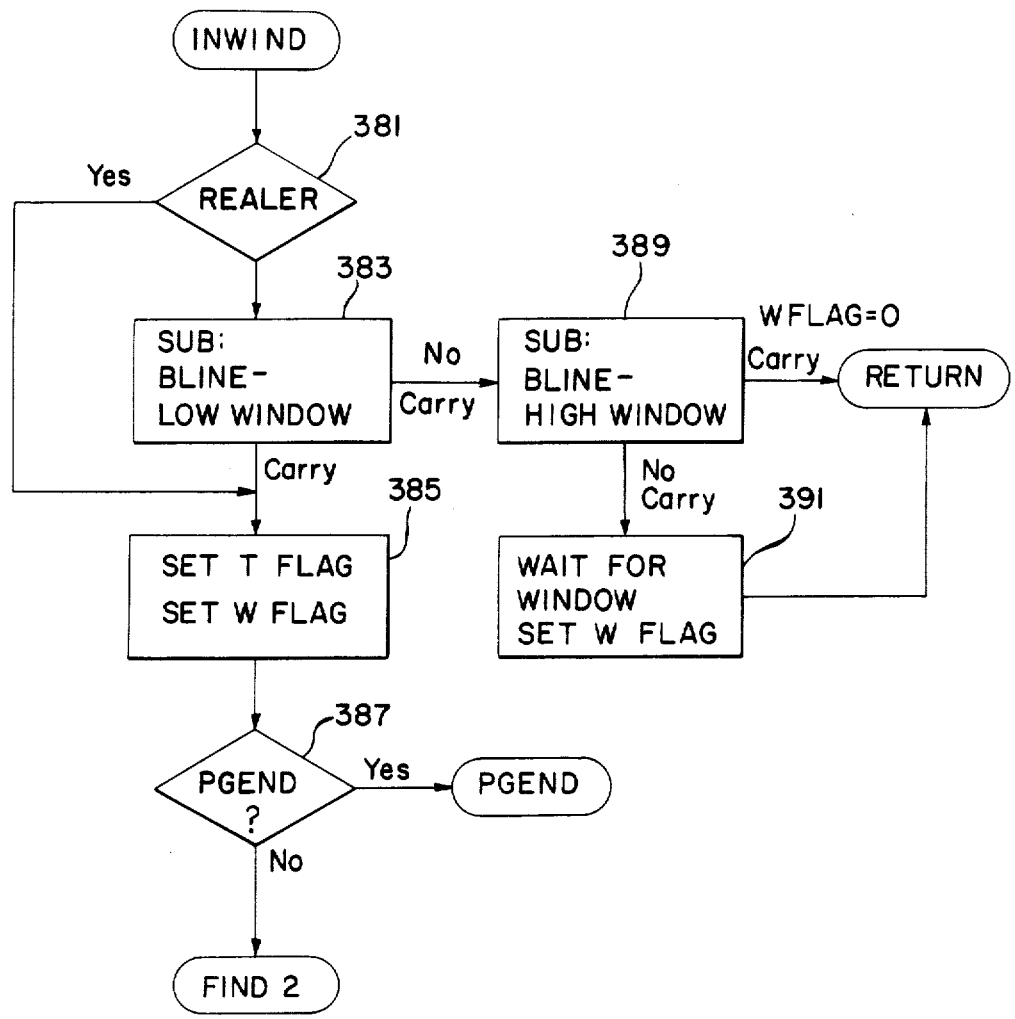
FIG. 8 is a flow chart useful in illustrating the operation of the central processing unit (CPU) of the preferred embodiment.

The subroutine INWIND shown in FIG. 8 compares the present BLINE value and the present engine scan line number (contained in a variable denoted ENG) to determine if a sufficient buffer ("low window") exists between them. This is indicated by block 383 of FIG. 8. Prior to this comparison, the routine performs a real time error test 381 to ascertain whether the engine has actually overtaken the building process and converts the engine scan line number to a pointer value in the line index array.

Figure 7:
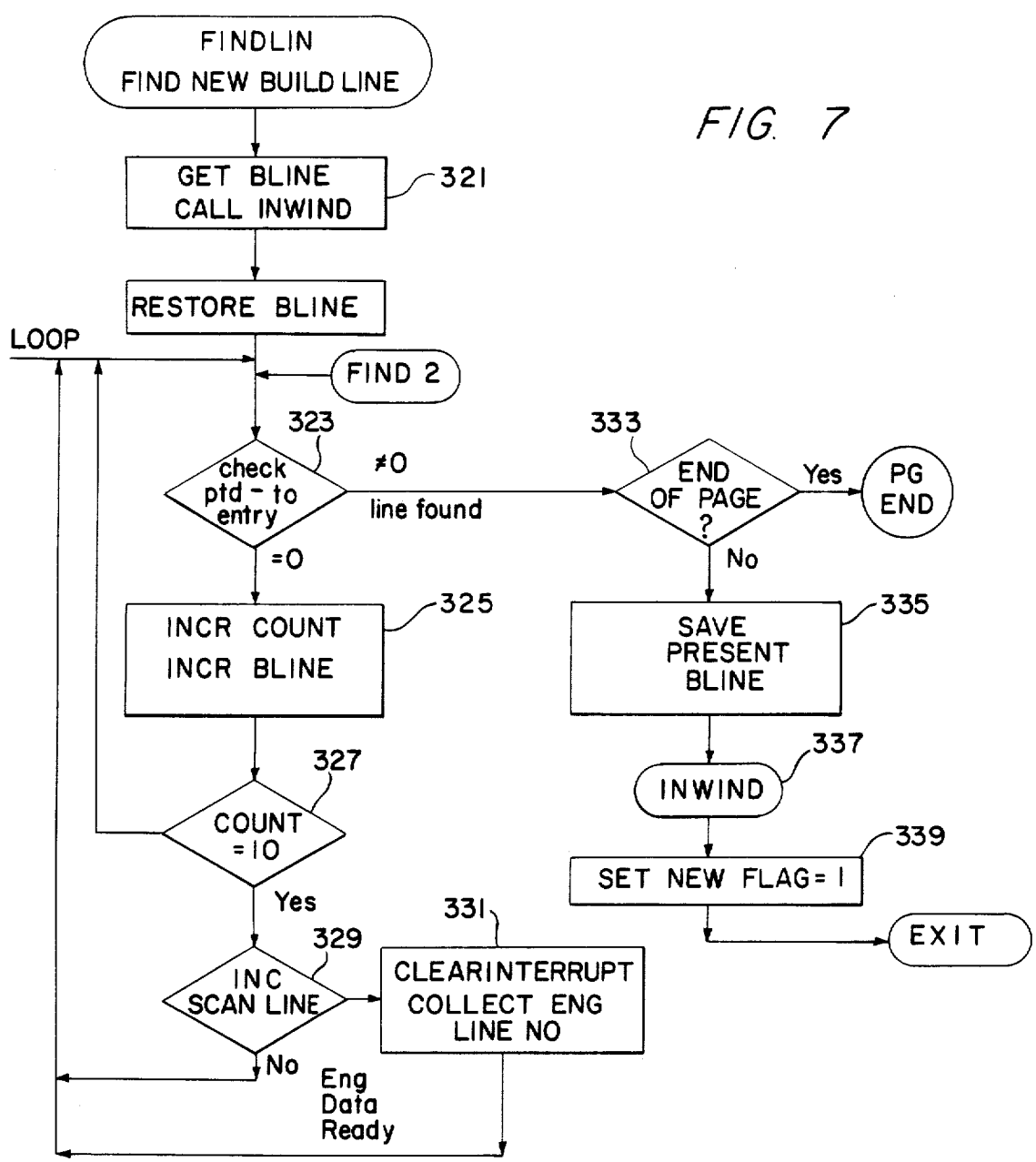
FIG. 7 is a flow chart useful in illustrating the operation of the central processing unit (CPU) of the preferred embodiment.

If the engine value has overtaken the building process, the INWIND routine will set WFLAG. In addition, the routine sets a bit in a variable TFLAG to indicate that some of the page has not been printed. TFLAG may be used by the other routines to determine how the strip map did at printing the page. If INWIND did detect that the engine overtook the building process, then instead of returning, it will set itself up to jump to the FIND2: label (FIG. 7). In FIND2, the processor skips ahead a number of lines to establish a new build line and again will perform INWIND.

If the low window comparison 383 confirms that the engine has not overtaken the build process, a second test 389 is performed to confirm that a sufficient buffer ("high window") exists between the build process and the engine process, i.e., there is no risk that the build process will overwrite the engine. If such a risk exists the software will set WFLAG and wait (block 391) for a sufficient buffer to develop as the engine process reads additional lines out to the printer 13. If test 389 indicates a sufficient window exists, WFLAG will be zeroed if necessary, prior to returning.

Assuming that INWIND determines the system is "in-window," the FINDLIN code proceeds to find the next scan line with characters linked to it. It does this by merely incrementing BLINE (block 325) to point to the next line index array entry and checking to see if it is nonzero (test 323). It continues to do this until it finds a nonzero entry. This process can take a long time if there are many blank scan lines in sequence. Since the interrupt routine is also responsible for monitoring the engine scan line, and since all other interrupts are disabled while the interrupt routine is executing, the engine line available bit is checked by reading bit 1 of the SMC status every so often, and a new value is read in if available (test 327, block 321). In order to make the line-finding procedure faster, ten lines are checked before the engine line available bit is checked, as indicated by test 327.

On finding a nonzero entry in the line index array at test 323, the interrupt routine next determines if it is the end of page marker, or a pointer to a linked list of character cells (test 333). If it is the end of page marker, it branches to the pagend: label. At this label, the processor interrupt enable is reset and synch to time slot achieved.

If the page is not ended, the processor saves the present BLINE value (block 335) and calls INWIND at 337. Assuming the system is found to be in-window, the processor sets NEWFLAG (block 339).

If the engine has somehow managed to overrun the building process at this time (which is probably not possible), INWIND will, of course, not return, but rather set the TFLAG bit and jump to FIND2: just as it did before. If the engine did not overrun the building process, then INWIND will return with WFLAG set to the appropriate value.

Since the hardware has only a single interrupt vector associated with it and since it must build characters and keep track of the current engine scan line (so that it can know if it can build characters), the the CPU 15 must check to see if the source of interrupt was from completion of the character building process or from the engine process finishing a scan line and going to the next. The test 301 in FIG. 6 determines the interrupt type and branches to the LINTST label if the interrupt is not a character interrupt. The LINTST code, shown in FIG. 9, accomplishes checking and handling the case of engine line increments.

When it is determined at test 341 that an engine scan line increment has been taken, the interrupt routine must read it in (block 343). Reading the low order byte clears the interrupt pending bit. Then a test 345 of the window state is made. If the processor is in out-of-window state, it calls INWIND (block 347) to check and set flags in case the system is now in-window. This call is the only one that can place the interrupt routine into the in-window state after it has been in the out-of-window state. If the routine was out-of-window, and is now in-window, then the CPU 15 can and does start sending characters to the hardware again. To do that, the routine checks to see if the character building hardware is not busy building a character (test 349). If it is not busy, then the routine jumps to the WRK2: label (FIG. 6) and goes through the same process as if it received a character interrupt. If the hardware is busy building a character, then eventually a character completion interrupt will be received. Therefore, the routine can safely exit as indicated by BLDXIT.

Figure 9:
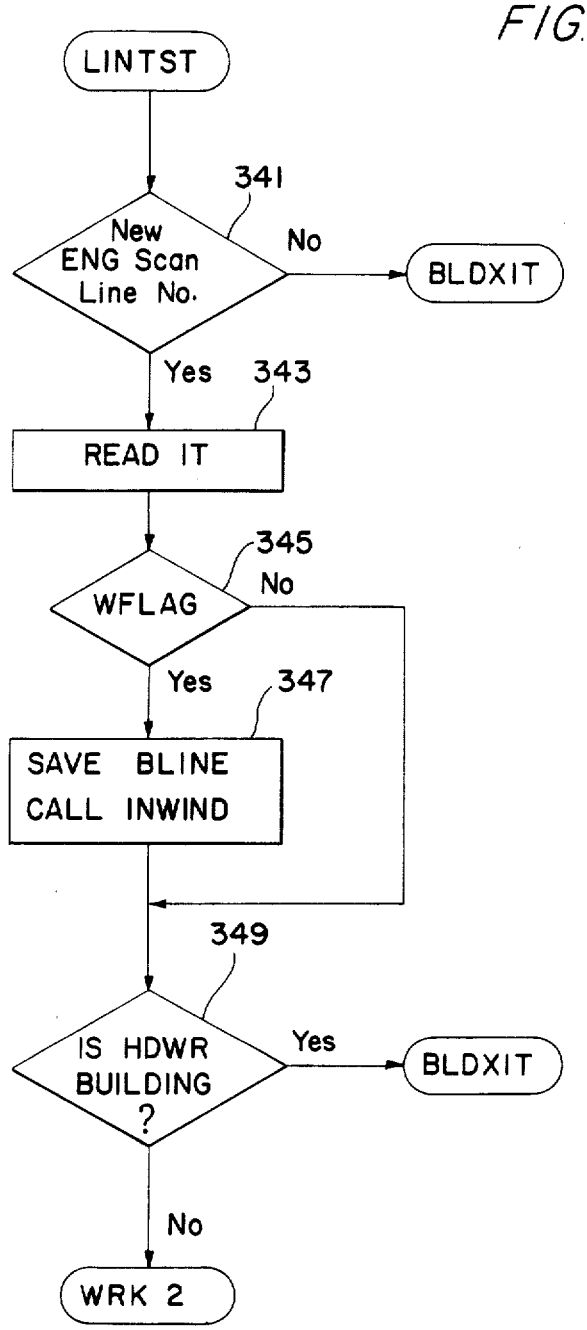
FIG. 9 is a flow chart useful in illustrating the operation of the central processing unit (CPU) of the preferred embodiment.

When the out-of-window state is detected at the beginning of the interrupt routine (test 300), the interrupt routine branches to the WTST: label (FIG. 11), which clears out any pending character interrupts by reading an appropriate I/O port (64H). It then proceeds with the usual LINTST code (FIG. 9). This prevents any further character building from occurring until the in-window state is entered.

Figure 10:
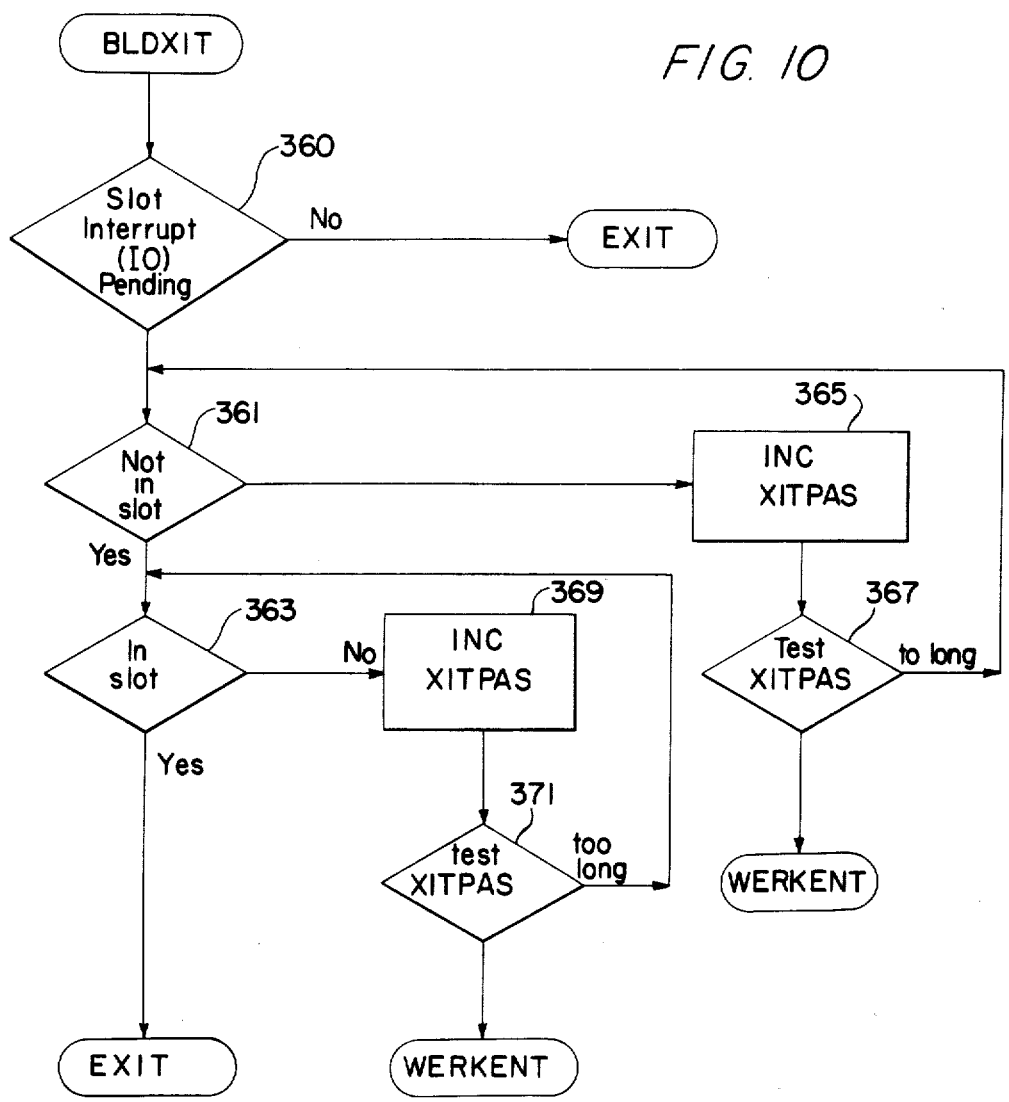
FIG. 10 is a flow chart useful in illustrating the operation of the central processing unit (CPU) of the preferred embodiment.
Figure 11:
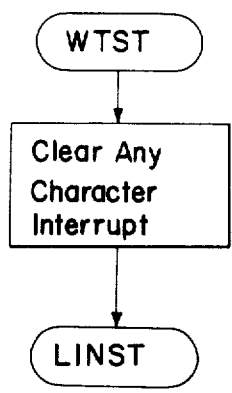
FIG. 11 is a flow chart useful in illustrating the operation of the central processing unit (CPU) of the preferred embodiment.

The strategy for exiting will now be discussed in conjunction with FIG. 10 which shows the label BLDXIT. The exit procedure checks to see if it must wait at all (test 360) (if not more than about 120 microseconds have been expended since the start of the interrupt routine, then it can always return from the interrupt). If waiting is necessary, then the processor checks to see if there is any more character building, or other tasks, that might be done. If it is not possible to exit and there is more work to do, then it is done, eventually returning to the exit code. Since the exit conditions are now sampled only when this work is completed, the next exit slot may be missed. The system may become trapped in the interrupt routine for the entire duration of printing the page. To prevent this lockup from occurring, a count of the number of unsuccessful exit attempts XITPAS is kept (block 369) and tested (test 371). If a selected number of tries is exceeded, then the processor ceases to try to do any useful work and merely tries to exit.

Once the interrupt routine is started up, it takes care of managing all of the variables it needs, and the next time it interacts with the rest of the system code is when it detects the end of page marker. At that point it will set a bit in TFLAG, generate a software signal to the engine process and disable its own interrupts.

To make starting up as simple as possible, and to avoid duplication of sections of code, a preferred startup procedure is to have the software "hand craft" the first character to be printed and initialize all the pointers. The handcrafted character, however, must be guaranteed to be in the first strip and prior to any other character to be printed.

As will be appreciated, many modifications and adaptations of the just-described embodiment of the invention may be made without departing from the scope thereof. Therefore, it is to be understood that, within the scope of the appended claims, the invention may be practiced other than as specifically described herein.

What is claimed is:

1. Apparatus for transferring character data to a printer means in response to a load request from the printer means comprising:

a font memory means for storing character data and character parameters including character height, character width and character address and for outputting said data and parameters in response to address control signals;

a strip map memory means for receiving character data from said font memory means in response to write address signals, and a major build signal for storing said data in a plurality of scan lines and for reading out said data in response to read address signals and a major engine signal;

a font address counter means connected for being loaded with an input from said font memory means in response to a first load control signal and for addressing said font memory means;

a character height counter means connected for being loaded with a character height count from said font memory means in response to a second load control signal, and for decrementing said count in response to a decrement control signal;

first logic means connected to said character height counter means for generating a build-over control signal in response to a selected count of said height counter means and for generating a build request signal in response to a build enable signal;

a character width counter means connected for being loaded with a character width from said font memory means in response to a third load control signal and for enabling receiving of a new character width from said font memory means in response to said decrement control signal;

detector means receiving inputs from said character width counter means for detecting a count indicative of the completion of writing character data comprising a single scan line into said strip map memory means and for producing an increment control signal and said decrement control signal;

a Y origin register means for receiving a Y origin write address;

an X origin register means for receiving an X origin write address;

a Y counter means connected to receive said Y origin write address and for supplying Y write addresses to said strip map memory means;

an X counter means connected to receive said X origin write address from said X origin register and for supplying X write addresses to said strip map memory means in response to said decrement control signal;

priority logic means for producing a build-go signal, said major engine signal and said major build signal in response to said build request signal and an engine request signal, and for inhibiting the production of a major build signal if an engine request signal is present;

second logic means for producing said first, second and third load control signals in response to said build-go signal and for enabling loading of the character height to said height counter means, the character width to said width counter means and the character data address to said font address counter means;

an X read address counter means for providing read address signals corresponding to the address of a selected location to be read in a row of said strip map memory means;

Y read address counter means for providing read address signals corresponding to the address of a selected scan line in said strip map memory means;

means producing a second increment control signal for incrementing said Y read address counter means after every scan line and for resetting said X read address counter means;

third logic means for generating said engine request signal in response to an engine enable signal and a said load request from said printer means;

means for generating an interrupt signal in response to said second increment control signal and said build-over control signal; and central processor means for reading said character parameters, generating and supplying said Y origin address to said Y origin register, a said X origin address to said X origin register, and for selectively generating said build enable signal for supply to said first logic means and said engine enable signal for supply to said third logic means in response to said interrupt signal, thereby respectively activating (1) the writing of a character to said strip map memory means without further intervention of said processor means and (2) the reading of a character out of said strip map memory means to said printer means without further intervention of said processor means.

2. Apparatus for controlling transfer of characters between a font memory and a printing means comprising:

strip map memory means for storing, in a plurality of storage lines, characters comprising less than an entire page;

means for extracting characters from said font memory and writing characters into said strip map memory means in response to first control signals and for generating a first interrupt when a complete character has been written;

means for reading characters out of said strip map memory means to said printing means line-by-line in response to second control signals, for maintaining an address indicative of the line being read out and for providing a second interrupt when a new line of a selected character is to be read;

programmed processor means for generating said first and second control signals, and supplying them to said character writing means and character reading means, respectively, for maintaining a first line indication indicating the line of said strip map memory means into which characters are being written and a second line indication indicating the line of said strip map memory means from which characters are being read; for deriving a window indication utilizing at least said first line indication, said window indication indicating whether storage space for writing additional characters exists in said strip map memory means, said programmed processor means functioning further to test said window indication in response to occurrence of a said first or second interrupt; to build a new character if said test indicates storage space is available and an interrupt of said first type has occurred; and to read an updated said address in response to an interrupt of said second type;

wherein said character writing means writes characters line-by-line and wherein said processor means performs a first test including the step of subtracting a first quantity from said first line indication, and, if no carry occurs, performs a second test including the step of subtracting a second quantity from said first line indication; and wherein if a carry occurs upon subtracting said first quantity, said processor means establishes a new line to be written and wherein if no carry is generated upon subtracting said second quantity, said processor means halts operation of said character writing means while a selected number of lines are read out by said character reading means.

3. Apparatus for controlling transfer of characters between a font memory and a printing means comprising:

strip map memory means for storing, in a plurality of storage lines, characters comprising less than an entire page;

means for extracting characters from said font memory and writing characters into said strip map memory means in response to first control signals and for generating a first interrupt when a complete character has been written;

means for reading characters out of said strip map memory means to said printing means line-by-line in response to second control signals, for maintaining an address indicative of the line being read out and for providing a second interrupt when a new line of a selected character is to be read;

programmed processor means for generating said first and second control signals, and supplying them to said character writing means and character reading means, respectively, for maintaining a first line indication indicating the line of said strip map memory means into which characters are being written and a second line indication indicating the line of said strip map memory means from which characters are being read; for deriving a window indication utilizing at least said first line indication, said window indication indicating whether storage space for writing additional characters exists in said strip map memory means, said programmed processor means functioning further to test said window indication in response to a said first or second interrupt; to build a new character if said test indicates storage space is available and an interrupt of said first type has occurred; and to read an updated said address in response to an interrupt of said second type;

wherein said processor means maintains a low window constant and determines said window indication by subtracting said low window constant from the current line at which characters are being written; and wherein said processor means establishes a new line to be written by skipping ahead a plurality of lines if a carry occurs on performance of said subtracting.

4. The apparatus of claim 3 wherein said processor means further maintains a high window constant, and wherein if no carry occurs on performance of said subtracting, the high window constant is subtracted from the current build line.

5. The apparatus of claim 4 wherein if no carry is generated upon subtracting of said high window constant, said processor means halts operation of said character writing means while a selected number of lines are read out by said character reading means.

6. Apparatus for controlling transfer of characters between a font memory and a printing means comprising:
   strip map memory means for storing, in a plurality of storage lines, characters comprising less than an entire page;
   means for extracting characters from said font memory and writing characters into said strip map memory means in response to first control signals and for generating a first interrupt when a complete character has been written;
   means for reading characters out of said strip map memory means to said printing means line-by-line in response to second control signals, for maintaining an address indicative of the line being read out and for providing a second interrupt when a new line of a selected character is to be read;
   programmed processor means for generating said first and second control signals, and supplying them to said character writing means and character reading means, respectively, for maintaining a first line indication indicating the line of said strip map memory means into which characters are being written and a second line indication indicating the line of said strip map memory means from which characters are being read; for deriving a window indication utilizing at least said first line indication, said window indication indicating whether storage space for writing additional characters exists in said strip map memory means, said programmed processor means functioning further to test said window indication in response to a said first or second interrupt; to build a new character if said test indicates storage space is available and an interrupt of said first type has occurred; and to read an updated said address in response to an interrupt of said second type;
   wherein said processor means maintains a low window constant and determines said window indication by subtracting said low window constant from the current line at which characters are being written; and
   wherein said processor means stores cell data including a character identification, font memory address and row address, and sends said cell data to said writing means in response to said first interrupt, and an in window state indicated by the absence of a carry upon subtracting of said low window constant and the presence of a carry upon subtracting of said high window constant.

7. The apparatus of claim 6 wherein, proir to sending said cell data, said processor means checks a flag indicating whether the character identified by the cell data begins on a new line, and if so, writes a new scan line number to said character writing means.

8. The apparatus of claim 7 wherein said processor means maintains a pointer pointing to the cell data representing the next character to be built and updates said pointer after sending said cell data.

9. The apparatus of claim 8 wherein said processor means maintains a second flag indicating whether characters remain to be written on the current line into which said character writing means is presently writing and, if said second flag is set, executes a routine to locate the next line with a character on it.

10. The apparatus of claim 9 wherein said routine includes the steps of checking whether the in-window state exists, and, if so, checking successive lines for a line having a character.

11. The apparatus of claim 10 wherein, after a selected number of lines are checked by said routine, said processor means performs a test to determine if character data is available to be read out of said strip map memory means by said character reading means and if so clears any said interrupt.

12. The apparatus of claim 9 wherein, if a said line having a character on it is found, said processor means performs an end of page test, if not, a test for the in-window state.

13. The apparatus of claim 7 wherein if the in-window state exists, said processor means performs a test to determine if a character is being written.

* * * * *